United States Patent
Bernstein et al.

(10) Patent No.: US 6,285,664 B1
(45) Date of Patent: Sep. 4, 2001

(54) METHOD AND APPARATUS FOR ESTIMATING PILOT COVERAGES

(75) Inventors: Neil E. Bernstein, Whippany; Xiao Cheng Wu, Parsippany, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/149,327

(22) Filed: Sep. 8, 1998

(51) Int. Cl.$^7$ .................................................... H04B 7/185
(52) U.S. Cl. ......................... 370/318; 370/320; 455/522
(58) Field of Search .................................. 370/318, 335, 370/320, 329, 311, 315, 331, 203, 252, 441; 455/522, 68, 69, 127, 574, 453, 450, 38.3

(56) References Cited

U.S. PATENT DOCUMENTS

| | | | |
|---|---|---|---|
| 5,548,808 | * 8/1996 | Bruckert et al. | 455/442 |
| 5,577,025 | * 11/1996 | Skinner et al. | 370/209 |
| 5,771,461 | * 6/1998 | Love et al. | 455/522 |
| 5,852,778 | * 12/1998 | Labedz | 455/423 |
| 5,889,768 | * 3/1999 | Storm et al. | 370/320 |
| 5,920,549 | * 7/1999 | Bruckert et al. | 370/331 |
| 6,160,799 | * 12/2000 | Krause et al. | 370/335 |

FOREIGN PATENT DOCUMENTS

WO 98 07207   2/1998  (EP).

* cited by examiner

Primary Examiner—Alpus H. Hsu
Assistant Examiner—Brian Nguyen
(74) Attorney, Agent, or Firm—Gibbons, Del Deo, Dolan, Griffinger & Vecchione

(57) ABSTRACT

A method and system that minimizes pilot signal overlap and radio frequency ("RF") interference by estimating changes in pilot coverage for different traffic channel loading and power conditions. Once base stations are positioned, a terminal for measuring received pilot signal strengths, such as a mobile station or pilot scanner, is used to collect and generate the baseline pilot survey data, which is then stored on a disk or tape. Base station transmit pilot $E_C/I_O$s, i.e., traffic channel loads on forward links, are also stored on disk or tape. The invention uses two adjustment factors associated with transmit power and traffic channel loading to optimize for different RF conditions, specifically for different base station transmit power or forward link loading conditions. For each RF condition, the methodology calculates the changes in the baseline pilot survey data. This reflects what $E_C/I_O$s a mobile station would receive under the given conditions. The systems engineer collects a set of optimized base station power settings for each of the different traffic channel load conditions. One of these optimized power settings is then selected by the systems engineer for each of the base stations.

21 Claims, 4 Drawing Sheets

METHOD AND APPARATUS FOR ESTIMATING PILOT COVERAGES

FIELD OF THE INVENTION

This invention relates to the field of wireless communications and in particular, to a method and apparatus for estimating pilot coverages under different radio frequency conditions.

BACKGROUND OF THE INVENTION

Wireless mobile communications provide the greatest convenience for users to access voice and data services essentially anywhere and anytime. Code Division Multiple Access ("CDMA") communication systems are one of the most promising digital wireless communication systems that can provide the desired mix of voice and data services. CDMA modulation techniques permit a large number of system users to communicate with one another.

The geographic coverage provided by the communications system is divided into coverage areas referred to as cells, where each cell corresponds to a base station. The cell may be further divided into multiple sectors. Communication channels allocated to a given cell and/or sector are determined according to various known methods. Each base station transmits a pilot signal that serves as a beacon for mobile radios that are in the base station's cell. The base stations use the same pilot signal but with different tuning offsets such that they may be distinguished. The geographic coverage provided by the base stations are also referred to as pilot coverages.

Given a system configuration, one optimization goal of the system engineer is to provide a good radio frequency ("RF") environment. Two factors in such an optimization are (1) minimizing multiple pilot regions (which are areas where pilot signals from different base stations have roughly the same signal strength), and (2) minimizing the impact of interference from other base stations. Each of these factors—pilot signal overlap and intercell interference—are directly impacted by the transmit power levels of base stations in a wireless system. Thus, a goal of the optimization process is to find base station transmit power levels which generally produce minimal pilot signal overlap and intercell interference. Such optimum transmit power levels are also a function of traffic load on the base stations.

Typically, once the base stations are positioned, a terminal for measuring received pilot signal strengths, such as a mobile station or pilot scanner, is used in the field to collect and generate a set of baseline data of pilot signal strength from various base stations (referred to as "baseline pilot survey data"). The baseline pilot survey data and the initial power settings of the base stations are then analyzed to identify RF problem areas, such as pilot signal overlap and intercell interference. The initial base station power settings are then adjusted in a conventional manner to correct the identified RF problems areas. The terminal is then used again to gather a new set of pilot survey data based on the adjusted power settings. These steps are repeated until the pilot signal overlap and intercell interference are minimized. The procedure is repeated for different traffic channel load conditions, where traffic channel load refers to the number of mobiles being served at a given time. Optimizing the system for different RF conditions or environments using currently available methods is, therefore, time consuming and expensive.

SUMMARY OF THE INVENTION

The present invention is an apparatus and method for minimizing pilot signal overlap and intercell interference by estimating changes in pilot coverages due to different traffic loading and base station power conditions. Specifically, the present invention determines from the baseline pilot survey data, the appropriate base station power settings for different traffic loads on the forward link, by minimizing pilot signal overlap and intercell interference. Importantly, the pilot coverage estimation only requires measurement of two parameters: (1) the transmitted pilot $E_C/I_O$, which is the ratio of the average transmit energy per chip for the pilot to the total transmit power spectral density, and (2) the mobile radio received pilot $E_C/I_O$, which is the ratio of the combined pilot energy per chip to the total received power spectral density at the mobile.

In an exemplary embodiment of the present invention, the system determines changes in the mobile received pilot $E_C/I_O$ by varying a pair of adjustment factors that relate to the base station transmit power and the traffic channel load conditions on the forward link. Base station initial traffic loading data and baseline pilot survey data are initially stored in terms of $E_C/I_O$. For each combination of the variable adjustment factors, the system calculates the changes from the baseline pilot survey data. The adjustment factors are varied until an optimum base station power setting (i.e., minimum pilot signal overlap, etc.) is obtained for each traffic channel load condition in the forward link. This results in a group of optimized base station power settings. The base station transmit power setting is then determined by selecting one setting that for example, corresponds to an actual loading condition of the base station, from the group of optimized transmit power settings.

BRIEF DESCRIPTION OF THE DRAWINGS

A more complete understanding of the present invention may be obtained from consideration of the following description in conjunction with the drawings in which.

DETAILED DESCRIPTION

Although the present invention is particularly well suited for a CDMA system and shall be so described, the present invention is equally well suited for use with other systems including Wideband CDMA (W-CDMA).

In general, the present invention permits system designers to estimate the changes in pilot coverage due to different traffic loading and base station power conditions. Once the base stations are positioned, a terminal for measuring received pilot signal strengths, such as a mobile station or pilot scanner, is used to collect and generate the baseline pilot survey data, which is then stored on a disk or tape. Base station initial transmit pilot $E_C/I_O$s, i.e., traffic channel loading data, are also stored on disk or tape. A pair of adjustment factors are input to vary the transmit power and ic channel loading until the pilot signal overlap and RF or intercell interference are minimized for each of the different base station transmit power and/or traffic loading conditions on the forward link.

For each traffic channel loading condition, the method of the invention determines the changes in the baseline pilot survey data by applying the adjustment factors to the initially stored data. The changes reflect what $E_C/I_O$s a mobile station would receive under the given conditions. The base station power settings that minimize at least pilot signal overlap and intercell interference are stored for each of the base stations. The systems engineer, therefore, obtains a set of optimized base station power settings for each of the different traffic channel load conditions. One of these optimized power settings is then selected by the systems engineer for each of the base stations.

Figure 1:
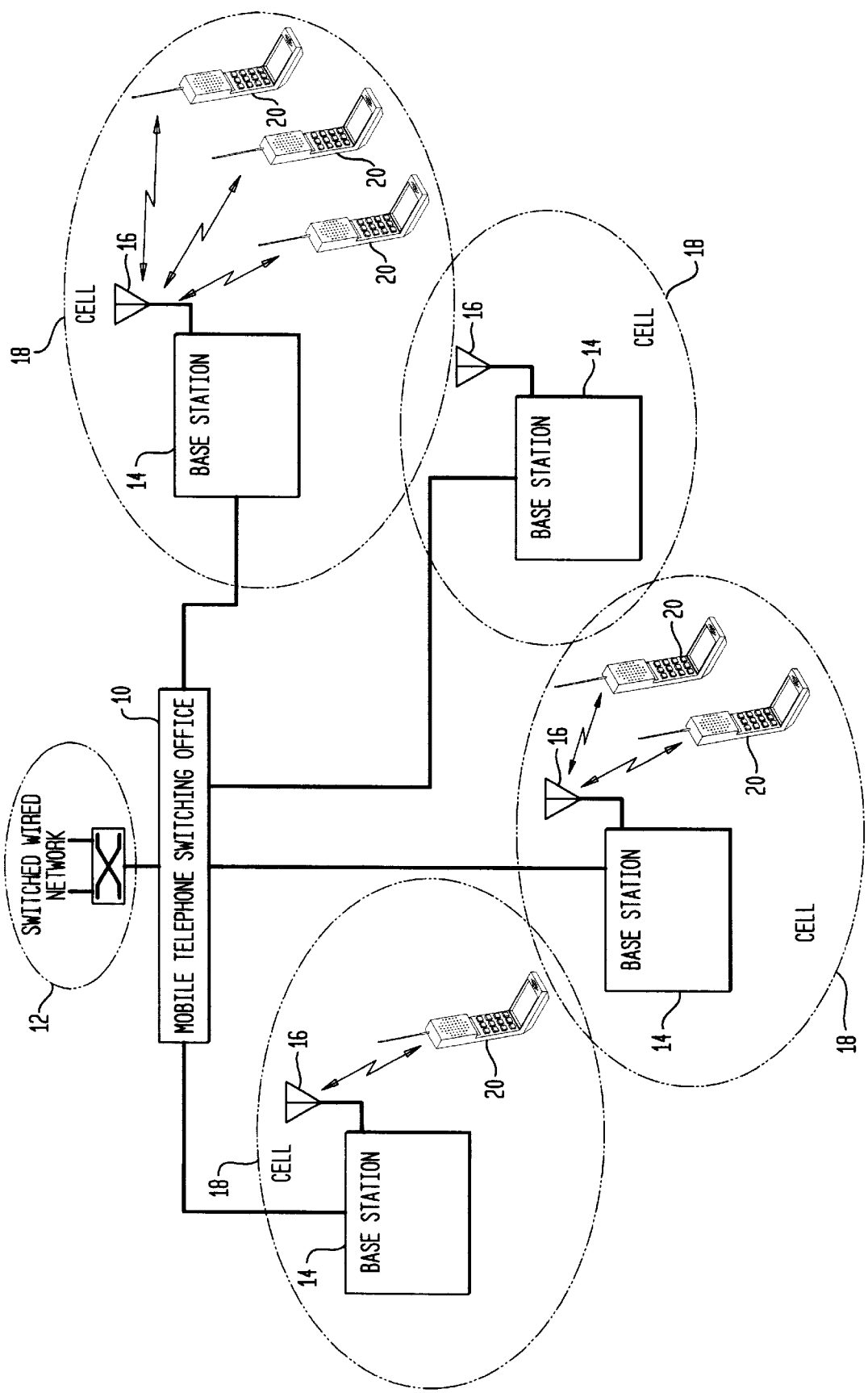
FIG. 1 is a representative block diagram of a typical wireless network.

Referring now to FIG. 1 there is shown a representative block diagram of a typical cellular wireless network. A Mobile Telephone Switching Office ("MTSO") 10, also know as a Mobile Switching Center ("MSC"), provides for switching calls between a cellular network and a switched wired network 12.

Figure 4:
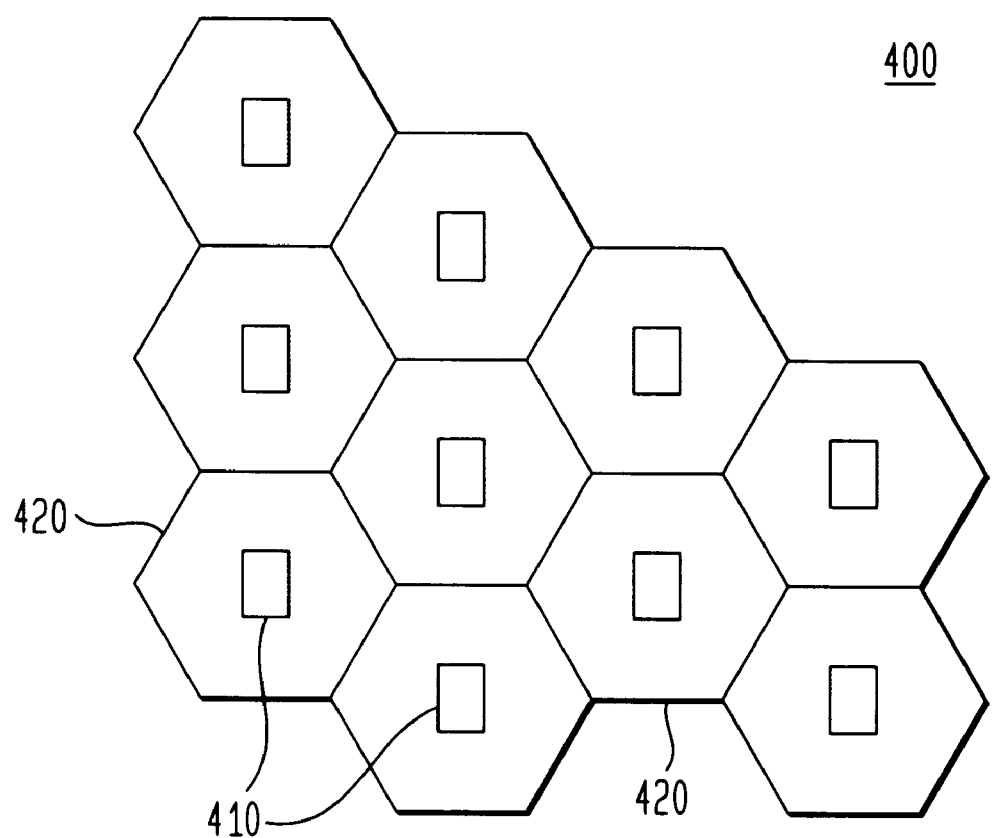
FIG. 4 illustrates base stations with corresponding pilot coverage areas.

MTSO 10 is connected to a plurality of cellular base stations 14. Cellular base station 14 includes a fixed position multi-channel transceiver that is coupled through a radio port to a cellular antenna 16. The geographical area for which cellular base station 14 acts as the communication gateway is called a cell 18. Various cellular base station 14 cells are distributed in suitable locations to form the system coverage. An exemplary configuration is illustrated in FIG. 4. Each cellular base station 14 has an identifiable pilot channel signal that provides a beacon for any cellular mobile units, mobile stations or mobile radios 20 that are in cell 18. Mobile radio 20 communicates with cellular base station 14 within cell 18 through a forward link (base station to mobile) that includes a pilot channel and multiple traffic channels, and a reverse link (mobile to base station) that includes multiple traffic channels and access channels.

Each base station 14 transmits a pilot signal of constant power on the same frequency. The power level of the received pilot signal (at the mobile radio) enables mobile radio 20 to estimate the path loss between base station 14 and mobile radio 20 as described in Applications of CDMA in Wireless/Personal Communications, Vijay K. Garg, Kenneth Smolik and Joseph E. Wilkes, Prentice Hall, 1997. Knowing the path loss, mobile radio 20 adjusts its transmitted power such that base station 14 will receive the access probe or traffic signal at the requisite power level as illustrated in Applications of CDMA in Wireless/Personal Communications, Vijay K. Garg, Kenneth Smolik and Joseph E. Wilkes, Prentice Hall, 1997. By setting proper transmit power levels at the base station, the present invention will efficiently minimize pilot signal overlap and intercell interference with respect to different traffic loads on the forward link.

The transit pilot power level and the received pilot strength are typically referred to in terms of $E_C/I_O$, where $E_C/I_O$ is the relative signal strength, or the fractional total power received over a particular pilot channel (i.e., from a particular base station), and where $E_C$ represents the energy per chip and Io represents the total received power. See Telecommunications Industry Association/Electronic Industry Association/Interface Standard-98 ("TIA/EIA/IS-98"), page 1–8, lines 8–10 and page 1–9, lines 33–34, respectively.

Figure 2:
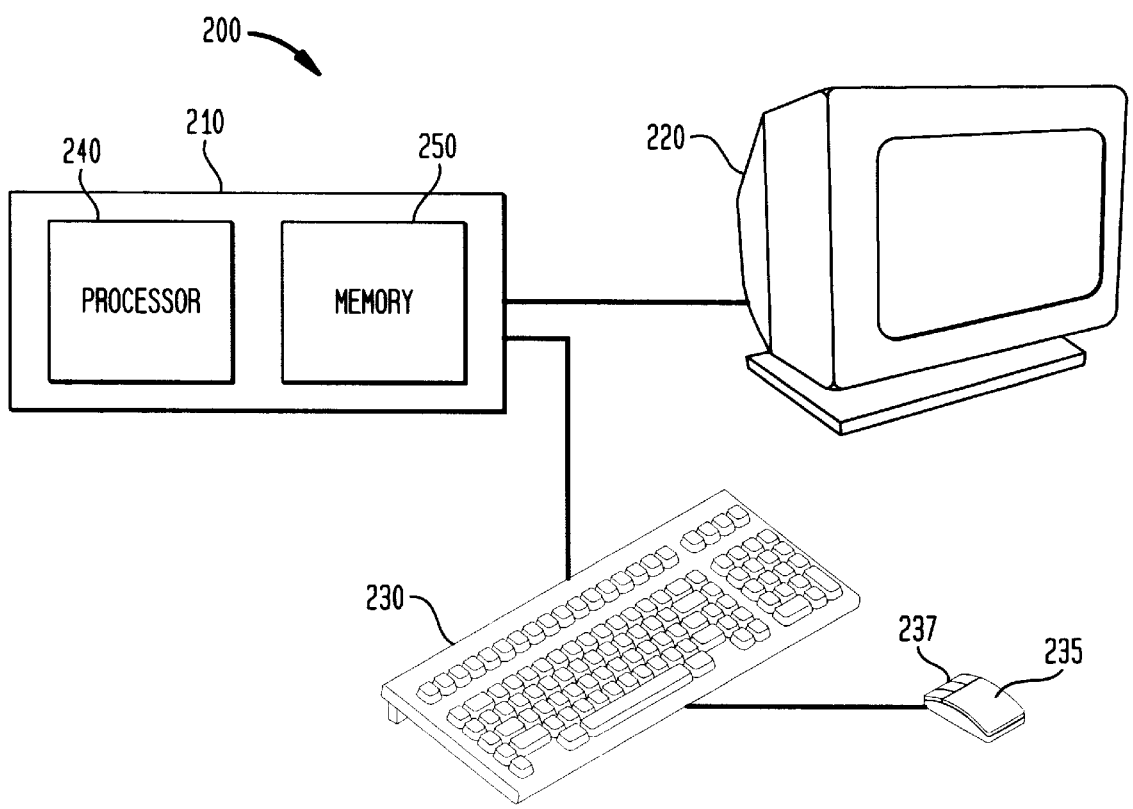
FIG. 2 depicts a pilot coverage predictor system utilizing a graphical user interface to manipulate adjustment factors that vary pilot coverage areas for corresponding base stations.

Referring to FIG. 2, there is illustrated an exemplary embodiment of a system 200 that is used in conjunction with the method of the invention. System 200 comprises a processing unit 210, a display screen terminal 220, input devices, e.g., a keyboard 230 and a mouse 235. Processing unit 210 includes a processor 240 and a memory 250. Mouse 235 includes switches 237 having a positive on and a positive off position for providing input signals to system 200. Screen 220, keyboard 230 and mouse 235 are collectively known as the display. A secondary memory (not shown) can also be coupled to processing unit 210 to access stored information.

In the exemplary embodiment, system 200 utilizes UNIX® as the computer operating system and X Windows® as the windowing system for providing an interface between the user and the operating system, typically referred to as a graphical user interface (GUI). UNIX, X Windows and the method of the invention can be found resident in the memory 250 of system 200 or in a memory of a centralized computer, not shown, to which system 200 is connected. Although described with respect to UNIX and X Windows, the present invention is also implement able with other computer operating systems and windowing systems.

Figure 3:
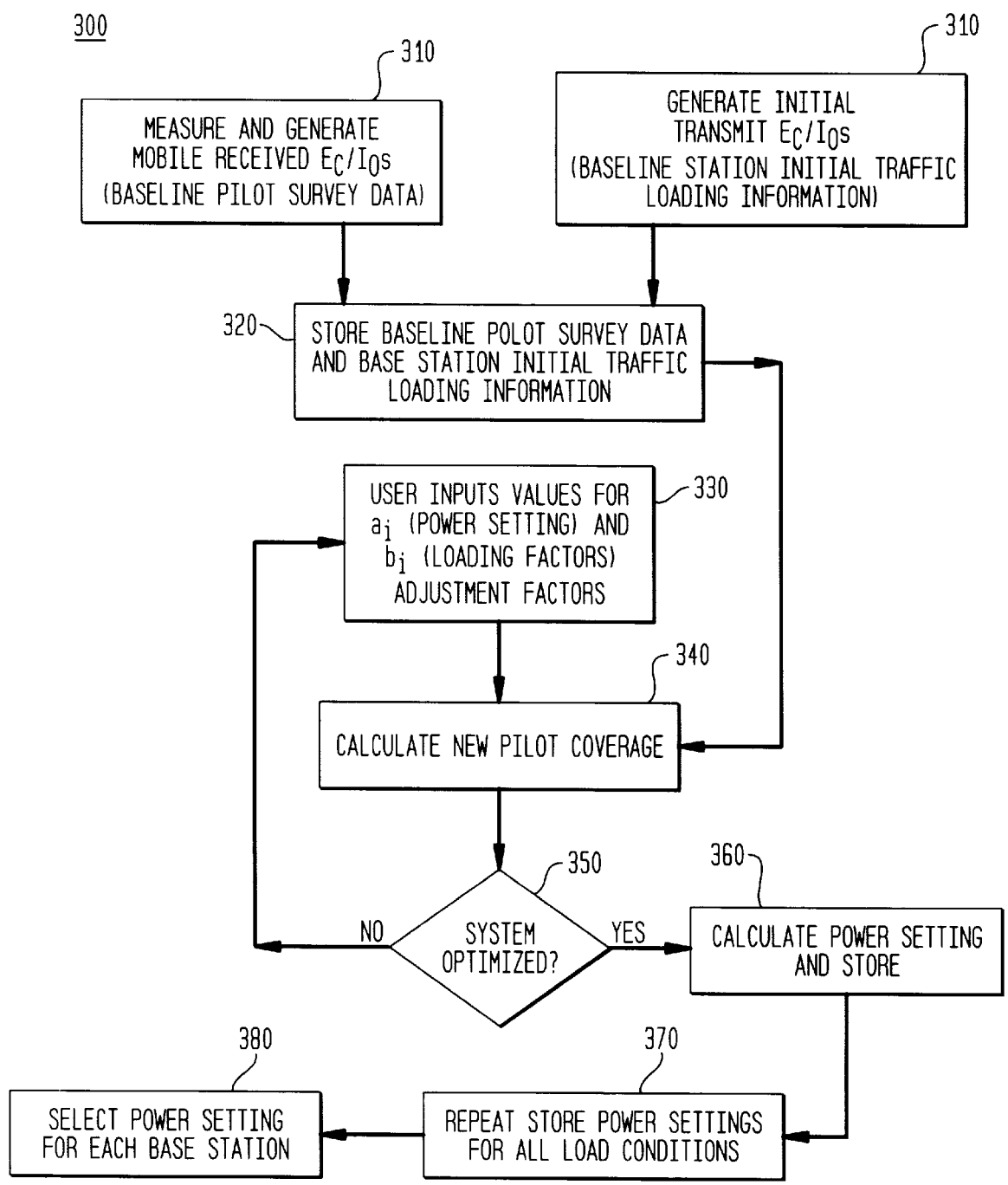
FIG. 3 is an exemplary flowchart illustrating the method of the pilot coverage predictor system of the present invention.

Referring now to FIG. 3, a flowchart 300 depicts the sequence of steps used by the method of the invention. The method is described in conjunction with FIG. 4, which depicts a partial coverage configuration 400 of multiple base stations 410 with associated cells 420. The shape of the cells are for illustrative purposes only.

Given system configuration 400 and nominal base station transmit power settings for each base station 410, a test mobile is used to measure and generate mobile pilot signal strength received $E_C/I_O$ for each base station, i.e., the baseline pilot survey data (step 310). Each base station 410 determines in a conventional manner an initial transmit $E_C/I_O$ that reflects the initial traffic loading conditions at the base station. Both the received and transmitted $E_C/I_O$s are stored in secondary storage, such as disks (step 320).

The method uses two adjustment factors to simulate different traffic channel and power setting conditions. The first adjustment factor, $a_i$, represents a variation in the transmit power for each base station i and second adjustment factor, $b_i$, represents a variation in the traffic channel loading for each base station i. For example, when $a_i=1$, base station power is it at its nominal level, i.e., no adjustment; when $a_i=2$, the base station power is doubled; and when $a_i=0.5$, the base station power is halved. In the case of $b_i$, a "1" again means no change from a nominal value, any value greater than 1 reflects an increase in the traffic channel load and any value less than one reflects a decrease in the traffic channel load. As shown below, applications of these two adjustment factors with the measured initial data allows system 200 to determine pilot signal strengths for each of the following conditions:

1. Change in base station transmit power only.
2. Change in base station traffic loading only.
3. Changes in both base station transmit power and base station traffic loading.

System 200 permits the system engineer to input values $a_i$ (base station transmit power) and $b_i$ (load on traffic channel) for each cell using the GUI. The input values for the adjustment factors In response to changes in cell transmit power or traffic load changes, the methodology of the invention calculates a new $E_C/I_O$ based upon the previous $E_C/I_O$ data and the cell traffic loading information.

Using the following relationships between the baseline pilot survey data, the base station initial transmit $E_C/I_O$ and the two adjustment factors, the methodology of the invention determines the changes in the pilot coverage areas (step 340).

As stated previously, the mobile received pilot signal strength, i.e., the baseline pilot survey data and the initial transmit settings (which reflect the initial traffic loading conditions at each base station), are stored in terms of transmitted and received $E_C/I_O$s. The ith cell transmit $E_C/I_O$ (e.g., initial transmit $E_C/I_O$) and the mobile received ith cell $E_C/I_O$ (e.g., baseline pilot survey data) can be expressed as:

$$e_{it} = \frac{E_i}{I_i} \tag{1}$$

$$e_{ir} = \frac{E_i}{\sum_{k=1}^{K} I_k + N} \tag{2}$$

where:

K is the total number of pilots seen by the test mobile.

$E_i$ is the mobile received ith cell pilot power, i=1, ..., K.

$I_i$ is the mobile received ith cell CDMA power, i=1, ..., K.

N is the mobile received non-CDMA power, including external interference and thermal noise.

$e_{it}$ is the fraction of pilot power in transmitted CDMA power of the ith cell, i=1, ..., K.

$e_{ir}$ is the fraction of the mobile received ith cell pilot power in the mobile received total power, i.e., the mobile received ith cell $E_C/I_O$, i=1, ..., K.

For each base station, or its associated cell i, $e_{it}$ represents the fractional pilot power transmitted with respect to the total CDMA power transmitted by the base station. Similarly, $e_{ir}$ represents the fractional mobile pilot power received with respect to the mobile received total power as seen by the test mobile for each cell i.

Using the adjustment factors of the invention, the mobile received ith cell pilot power and the CDMA power after the adjustment is expressed by:

$$E_i' = a_i E_i \tag{3}$$

$$I_i' = a_i b_i I_i \tag{4}$$

where:

$a_i$ is the ith cell transmit power adjustment factor, $a_i \geq 0$, i=1, ..., K.

$b_i$ is the ith cell traffic channel loading adjustment factor, $b_i \geq 0$, i=1, ..., K.

$E_i$ is the mobile received ith cell pilot power after the adjustment, i=1, ..., K.

$I_i$ is the mobile received ith cell CDMA power after the adjustment, i=1, ..., K.

Basically, the prior mobile received pilot power is multiplied by the cell transmit power adjustment factor $a_i$ to obtain the new mobile received pilot power. The prior mobile received CDMA power, however, is multiplied by both $a_i$ and $b_i$ (cell traffic channel loading variable) to determine the new mobile received CDMA power. This is because the $I_i$ is dependent on both the transmitted power and the amount of traffic in the cell.

In order to use the adjustment factors and the given data, an expression relating $e_{it}$ to $e_{ir}$ is required. This is accomplished by re-writing Equation 2, which reflects the mobile received ith cell $E_C/I_O$, to extract the $I_i$ term and re-arranging it in terms of noise-to-total-power as follows:

$$e_{ir} = \frac{\frac{E_i}{I_i}}{\left(\sum_{k=1}^{K} I_k + N\right)/I_i} = \frac{e_{it}}{\sum_{k=1}^{K} \frac{I_k}{I_i} + \frac{N}{I_i}} \tag{5}$$

$$\frac{N}{I_i} = \frac{e_{it}}{e_{ir}} - \sum_{k=1}^{K} \frac{I_k}{I_i}$$

Specifically, equation 5 now expresses the relationship between the noise and total power of base station i as seen by the test mobile. By re-arranging equation 5, an expression relating total power between base stations is determined:

$$\sum_{k=1}^{K} I_k + N = \frac{e_{it}}{e_{ir}} I_i = \frac{e_{jt}}{e_{jr}} I_j \quad i, j = 1, \ldots, K \tag{6}$$

$$\frac{I_j}{I_i} = \frac{e_{jr}}{e_{jt}} * \frac{e_{it}}{e_{ir}}$$

As shown below, the advantage of equation 6 is that $I_i$ is expressed in terms $e_{it}$ and $e_{ir}$, and can be used for simplifying the determination of the new $e_{ir}$.

Using the relationship of equation 2, the new mobile-received ith cell $E_C/I_O$, $e_{ir}'$, is determined by calculating new $E_i$ and $I_i$ s and is initially expressed as follows:

$$e_{ir}' = \frac{E_i'}{\sum_{k=1}^{K} I_k' + N} \tag{7}$$

where $e_{ir}'$ is the mobile received ith cell $E_C/I_O$ after the adjustment, i=1, ..., K.

$E_i$ is the mobile received ith cell pilot power after the adjustment, i=1, ..., K.

$I_i$ is the mobile received ith cell CDMA power after the adjustment, i=1, ..., K.

Inserting the base station transmit power and the traffic loading adjustment factor relationships expressed in equations 3 and 4 into equation 7, results in $$e_{ir}' = \frac{a_i E_i}{\sum_{k=1}^{K} a_k b_k I_k + N} = \frac{\frac{a_i E_i}{I_i}}{\sum_{k=1}^{K} a_k b_k \frac{I_k}{I_i} + \frac{N}{I_i}} \tag{8}$$

Simplification of equation 8 is achieved by substituting $e_{it}$ (from equation 1) and the $N/I_i$ expression for noise to total power from equation 5, resulting in:

$$e_{ir}' = \frac{a_i e_{it}}{\sum_{k=1}^{K} a_k b_k \frac{I_k}{I_i} + \frac{e_{it}}{e_{ir}} - \sum_{k=1}^{K} \frac{I_k}{I_i}} \tag{9}$$

-continued $$= \frac{a_i e_{it}}{\sum_{k=1}^{K}(a_k b_k - 1)\frac{I_k}{I_i} + \frac{e_{it}}{e_{ir}}}$$

Further simplification is achieved by substituting the $I_i/I_i$ expression for relating total power between base stations, resulting in:

$$e'_{ir} = \frac{a_i e_{it}}{\sum_{k=1}^{K}(a_k b_k - 1)\frac{e_{kr}}{e_{kt}} * \frac{e_{it}}{e_{ir}} + \frac{e_{it}}{e_{ir}}} \quad (10)$$

Equation 10 is further simplified as follows:

$$e'_{ir} = \frac{a_i e_{ir}}{\sum_{k=1}^{K}(a_k b_k - 1)\frac{e_{kr}}{e_{kt}} + 1} \quad (11)$$

Using the expression of Equation 11, the methodology of the invention operates to compute a new $E_C/I_O$ ($e_{ir}$), based upon the previous $E_C/I_O$ data, the cell traffic loading data ($e_{ir}$, $e_{kr}$, and $e_{kt}$) in response to changes in cell transmit power ("$a_i$") or traffic load changes ("$b_i$").

Referring back to FIGS. 3 and 4, the system and methodology of the invention permits the system engineer to tune the adjustment factors with respect to the stored data until pilot signal overlap and intercell interference are minimized for each base station (step 350). The final adjustment factors and $e_{ir}'$ are then used to calculate the optimized base station power settings for that traffic channel load condition (step 360). The process is then repeated for different channel load conditions and a set of optimized transmit power settings are obtained (step 370). The system engineer then selects one of the optimized transmit power settings for each of the base stations in the system configuration (step 380).

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a wireless communications system having base stations and means for generating baseline pilot survey data and base station initial traffic loading information, a method for establishing base station transmit power levels for different operating conditions, said method comprising the steps of:

inputting values for a first adjustment factor which represents a cell transmit power adjustment factor and a second adjustment factor which represents a cell traffic channel loading adjustment factor;

calculating pilot coverages based on said baseline pilot survey data, said base station initial traffic loading information, said cell transmit power adjustment factor and said cell traffic channel loading adjustment factor; and setting transmit power levels for at least one of the base stations based on a selected pilot coverage criteria.

2. The method according to claim 1, wherein said base station initial traffic loading information represents the ratio of pilot signal power to total power transmitted by a base station.

3. The method according to claim 1, wherein said baseline pilot survey data represents the ratio of pilot signal power received to total received power at a mobile station.

4. The method according to claim 1, wherein said step of setting includes the step of tuning said first adjustment factor and said second adjustment factor until pilot signal overlap and interference are minimized.

5. The method according to claim 1, further including the step of repeating said steps of inputting, calculating and setting for different traffic channel loads.

6. The method according to claim 1, wherein said base station initial traffic loading information is initial transmit $E_C/I_O$s, where $E_C/I_O$ is the fractional total power received over a particular pilot channel and where $E_C$ represents the energy per chip and Io represents the total transmit power for a particular base station.

7. The method according to claim 1, wherein said baseline pilot survey data are test mobile received $E_C/I_O$s, where $E_C/I_O$ is the fractional total power received over a particular pilot channel and where $E_C$ represents the energy per chip and $I_O$ represents the total received power.

8. The method according to claim 1, wherein said selected pilot coverage criteria is minimization of pilot coverage overlap and interference from other base stations.

9. The method according to claim 1, wherein:

said base station initial traffic loading information represents the ratio of pilot signal power to total power transmitted by a base station; and said baseline pilot survey data represents the ratio of pilot signal power received to total received power at a mobile station.

10. In a wireless communications system having at least one base station and means for generating mobile received $E_C/I_O$s and initial transmit $E_C/I_O$s, a method for optimizing interference under different power and loading conditions, said method comprising the steps of:

selecting values for a first adjustment factor and a second adjustment factor, said first adjustment factor corresponding to base station power and said second adjustment factor corresponding to traffic channel loading conditions;

calculating new transmit $E_C/I_O$s based on said mobile received $E_{C/IO}$s, said initial transmit $E_C/I_O$s, selected values of said first adjustment factor and selected values of said second adjustment factor; and setting transmit power levels for said at least one base station based on a selected pilot coverage criteria.

11. The method according to claim 10, wherein said step of setting includes the step of tuning said first adjustment factor and said second adjustment factor until pilot signal overlap and RF interference are minimized.

12. The method according to claim 11, further including the step of repeating said steps of selecting, calculating and setting for different traffic channel loads.

13. In a wireless communications system having base stations and a mobile radio, a device for optimizing radio frequency interference under different power and loading conditions, said device comprising:

a memory for storing baseline pilot survey data and base station initial traffic loading information generated at the mobile radio and at the base stations;

an interface for inputting values for a cell transmit power adjustment factor and a cell traffic channel loading adjustment factor; and a processor for calculating pilot coverages based on said baseline pilot survey data, said base station initial traffic loading information, said cell transmit power adjustment factor and said cell traffic channel loading adjustment factor.

14. The device according to claim 13, further including a display for showing optimized pilot coverages that are used by a user to set initial transmit power levels for each of the base stations.

15. The device according to claim 13, wherein said base station initial traffic loading information are initial transmit $E_C/I_O$s, where $E_C/I_O$ is the fractional total power received over a particular pilot channel and where $E_C$ represents the energy per chip and $I_O$ represents the total transmit power for a particular base station.

16. The device according to claim 13, wherein said baseline pilot survey data are test mobile received $E_C/I_O$s, where $E_C/I_O$ is the fractional total power received over a particular pilot channel and where $E_C$ represents the energy per chip and $I_O$ represents the total received power.

17. The device according to claim 13, wherein said interface and said processor are operable to tune said first adjustment factor and said second adjustment factor until pilot signal overlap and RF interference are minimized.

18. A system for estimating pilot coverages for different operating conditions, said system comprising:

a memory for storing baseline pilot survey data generated at a test mobile and base station initial traffic loading information generated at base stations;

an interface for inputting values for cell transmit power adjustment factor and cell traffic channel loading adjustment factor; and a processor for calculating pilot coverages based on said baseline pilot survey data, said base station initial traffic loading information, said cell transmit power adjustment factor and said cell traffic channel loading adjustment factor.

19. The system according to claim 18, further including a display for showing optimized pilot coverages that are used by a user to set initial transmit power levels for each of the base stations.

20. The device according to claim 19, wherein said interface and said processor are operable to tune said first adjustment factor and said second adjustment factor until pilot signal overlap and RF interference are minimized.

21. The system according to claim 18, wherein:

said base station initial traffic loading data represents the ratio of pilot signal power to total power transmitted by a base station; and said baseline pilot survey data represents the ratio of pilot signal power received to total received power at a mobile station.

* * * * *